(12) United States Patent
Bruton et al.

(10) Patent No.: US 10,228,162 B2
(45) Date of Patent: Mar. 12, 2019

(54) FOUR PASS HIGH EFFICIENCY FURNACE AND HEAT EXCHANGER

(71) Applicant: Heatco, Inc., Cartersville, GA (US)

(72) Inventors: Eric R. Bruton, Cartersville, GA (US);
Matthew W. Reese, Temple, GA (US);
Terrance C. Slaby, Canton, GA (US)

(73) Assignee: Heatco, Inc., Cartersville, GA (US)

( * ) Notice: Subject to any disclaimer, the term of this patent is extended or adjusted under 35 U.S.C. 154(b) by 481 days.

(21) Appl. No.: 14/931,062

(22) Filed: Nov. 3, 2015

(65) Prior Publication Data
US 2016/0216005 A1    Jul. 28, 2016

Related U.S. Application Data

(60) Provisional application No. 62/106,933, filed on Jan. 23, 2015.

(51) Int. Cl.
*F24H 3/06* (2006.01)
*F24H 8/00* (2006.01)
(Continued)

(52) U.S. Cl.
CPC ............ *F24H 8/006* (2013.01); *F24H 3/087* (2013.01); *F24H 9/0057* (2013.01); *F24H 9/1881* (2013.01); *Y02B 30/106* (2013.01)

(58) Field of Classification Search
CPC . F24H 8/00; F24H 8/006; F24H 3/087; F24H 9/2085; F24H 3/025; F24H 9/0068; F24D 19/1084; F24D 5/04; F24F 11/006; F24F 2011/0091; F24F 11/0012; F24F 11/0086; F24F 2011/0047; F24F 11/001; F24F 2011/0052; F24F 2011/0068;
(Continued)

(56) References Cited

U.S. PATENT DOCUMENTS 3,111,939 A * 11/1963 Peoples ................... F24H 3/087
126/104 A
4,974,579 A   12/1990 Shellenberger et al.
(Continued)

FOREIGN PATENT DOCUMENTS

WO       2000079186 A1    12/2000

OTHER PUBLICATIONS

Heatco Inc., Heatco Installation and Service Manual EC(A, G) Series High Efficiency Duct Furnace, pp. 1-27.
(Continued)

*Primary Examiner* — Jason Lau
(74) *Attorney, Agent, or Firm* — McDonald Hopkins LLC

(57) ABSTRACT

The present provides a condensing heat exchanger assembly that includes a plurality of heat exchanger passes. The condensing furnace includes a burner assembly having a combustion air device and further includes a frame having primary heat exchanger with a first pass and a second pass. A secondary heat exchanger having a third pass and a fourth pass. The primary heat exchanger assembly may be generally parallel to the secondary heat exchanger assembly such that supply airflow may traverse over the primary and secondary heat exchangers simultaneously in both a first direction and in an opposite second direction. The first pass may include a single drum. The second pass, third pass and fourth pass may include a plurality of aligned tubes.

23 Claims, 6 Drawing Sheets

(51) Int. Cl.
*F24H 3/08* (2006.01)
*F24H 9/00* (2006.01)
*F24H 9/18* (2006.01)

(58) Field of Classification Search
CPC ....... F24F 2011/0075; F24F 2011/0071; F24F 2011/0061; F24F 2011/0064
See application file for complete search history.

(56) References Cited

U.S. PATENT DOCUMENTS

| | | | |
|---|---|---|---|
| 5,020,320 A * | 6/1991 | Talbert | F24D 15/04 237/2 B |
| 6,938,688 B2 | 9/2005 | Lengauer et al. | |
| 8,021,143 B2 | 9/2011 | Slaby | |
| 8,807,092 B2 | 8/2014 | Smelcer | |
| 8,826,901 B2 | 9/2014 | Haydock et al. | |
| 2010/0221675 A1* | 9/2010 | Rowe | F22D 1/06 432/29 |
| 2012/0192849 A1* | 8/2012 | Alphs | F24H 3/087 126/112 |
| 2014/0102673 A1 | 4/2014 | Joardar et al. | |

OTHER PUBLICATIONS

Modine Manufactuing Company, Atherion Brochure, pp. 1-10, 2011.
Allegheny Technologies Incorporated (ATI), AL 29-4V data sheet, pp. 1-7, 2014.

* cited by examiner

FOUR PASS HIGH EFFICIENCY FURNACE AND HEAT EXCHANGER

CROSS-REFERENCE TO RELATED APPLICATIONS

This application claims priority to U.S. Provisional Application No. 62/106,933 titled, FOUR PASS HIGH EFFICIENCY HEAT EXCHANGER, filed on Jan. 23, 2015 which is hereby incorporated by reference in its entirety.

FIELD OF INVENTION

The present disclosure generally relates to a heater system concerned with a heater unit which is adapted to be installed in the ducting of an air handling system. More particularly, the present disclosure relates to a condensing furnace system with high efficiency.

BACKGROUND

Condensing furnaces have been used to improve heating efficiency from conventional mid-efficiency furnaces for a number of years in residential heating applications. Typical conventional gas furnaces employ a burner to combust a gaseous fuel, a primary heat exchanger for transferring heat from combustion gases to the circulating air stream, a blower to circulate return air from the space to be heated over the external surfaces of the heat exchanger and through a duct system, providing warm air to the home or structure. These furnaces often include an induced draft fan to draw out and vent the flue products from within the primary heat exchanger. Condensing furnaces typically employ a secondary (recuperative) heat exchange section to transfer additional heat from the combustion products after they have passed through the primary heat exchanger thereby improving the operating efficiency of the furnace.

The main differences between a conventional furnace and a condensing furnace are the heat exchanger technology used to extract heat from the combustion process and the method used to exhaust the combustion gases. Conventional furnaces, such as mid-efficiency conventional furnaces, are designed to transfer sensible heat from the combustion gases to the heat exchanger as they are cooled. However, combustion gases may remain above their dew point temperature, and exit the heat exchanger into the exhaust vent at temperatures typically in excess of 250° F. (121° C.). In these embodiments, heat is lost through the vent and limits thermal efficiency such that, in some cases, maximum thermal efficiency is limited to about 83%. In contrast, condensing furnaces are designed to transfer sensible heat and also transfer latent heat during condensation. These features may provide a higher rate of heat transfer to the circulating supply air of a heating system than conventional furnaces. Combustion gases are cooled below their dew point temperature in the recuperative heat exchanger and exit the heat exchanger into the exhaust vent at temperatures typically below 130° F. (54° C.). Therefore, in some cases, condensing furnaces may achieve maximum thermal efficiencies that are greater than 90%.

Condensing furnaces may provide a longer dwell time of heated flue gases than conventional furnaces, even to the point where the combustion exhaust gases "cool" and condense. This longer dwell time has been accomplished by using two heat exchangers, one for primary heat exchange and one for secondary heat exchange. The primary heat exchanger communicates with the secondary recuperative coil through a common flue gas collector box. Circulating air flow across the heat exchangers may be directional and limited by furnace or heat exchanger design.

In the primary heat exchanger, sensible heat is transferred from the combustion products as they are cooled while the temperature of the combustion gases remain above their dew point. Generally, primary heat exchangers may include a plurality of tubes, formed sections, or a single cavity "drum" to house the combustion of the gaseous fuels therein. This primary or leading heat exchanger assembly section may be made from conventional heat exchanger materials (i.e., aluminized steel, 409 SS, 304 SS). The secondary (recuperative) heat exchanger assembly may be made with a plurality of tubes using high grade corrosion resistant materials and is used to transfer additional heat from the combustion gases. This secondary heat exchanger cools combustion products sufficiently to condense a portion of the water vapor in the combustion products. Furnaces can achieve efficiencies exceeding 90% by condensing a portion of the water vapor produced as a standard by-product of the combustion process present in the flue gases, utilizing the latent heat of vaporization (972 Btu/lb. of water condensed).

Residential high efficiency furnaces may be typically located in a heated space (non-weatherized) and the air to be heated is return air from the heated space. In these furnace designs, air typically traverses the heat exchanger sections in series, i.e. over the secondary heat exchanger first and then over the primary heat exchanger assembly. The circulating air stream passing over the heat exchanger sections is typically within 5 to 10° F. (1 to 3° C.) of the conditioned space temperature.

Commercial heating furnaces and duct furnaces are often located outdoors (weatherized), typically on rooftops and therefore are exposed to outdoor temperatures. Commercial heating products are also used to provide ventilation air from outdoors (make-up air) to meet ASHRAE and EPA indoor air quality requirements. This air must then be heated to maintain comfort temperatures in the ventilated area. Even in make-up air applications where the heating apparatus is located indoors, the heating apparatus may be exposed to different conditions, for example, 100% outdoor air (circulating air) may be directed across the heat exchanger and, therefore, may initially traverse the heating unit at outdoor temperatures. In extreme northern climates, entering air may be below 0° F. (−17.8° C.). This can result in reduced heat exchanger surface temperatures and reduced temperatures of the combustion gases inside the heat exchanger.

Currently, "non-weatherized" (indoor installations) condensing furnace designs direct entering air flow over the secondary heat exchanger first, which is suitable for entering air temperatures that are above 40° F. (4.4° C.). Typically, manufacturers of this type of condensing furnace include warnings about limiting the minimum inlet supply air temperature to 40° F. (4.4° C.) and locating the furnace in a space where the temperature never drops below 40° F. (54° C.). Otherwise, these conditions could result in freezing of condensate in the condensing recuperative coil assembly and preclude their use in "weatherized" (outdoor) applications.

Current and proposed building efficiency standards (ASHRAE, DOE and Canadian Provincial authorities) are mandating higher efficiencies, particularly for weatherized commercial furnace applications (i.e., rooftop or make-up air type furnaces). Clean Air and Green Building initiatives are also requiring increased ventilation rates, necessitating higher heat inputs to temper the make-up air.

For commercial applications, one design variation of a conventional high capacity mid-efficiency weatherized furnace is a drum and tube design. This design typically provides two (2) or three (3) heat exchanger passes to transfer sensible heat from the combustion gases. The first pass incorporates a single larger diameter tube or drum into which the gas burner fires. Typically this burner is a forced draft type. The second pass (and third pass if used) employ multiple tubes to transfer sensible heat to the circulating air stream. The passes are disposed in series to the circulating air stream, i.e. the supply air sequentially passes over the first pass tube or drum, then the second pass tubes and then the third pass tubes (if provided). Combustion gases exiting the last pass of the heat exchanger into the exhaust vent are in excess of 250° F. (121° C.). Efficiencies for this design are between 80 and 83%. Commercial heating systems may also operate with varying gas firing rates or gas input ratings. "Turndown" is a ratio that refers to the operational range of a furnace and may be defined as the ratio of the maximum heat output to the minimum level of heat output at which the heat exchanger may operate efficiently or controllably. Modulating furnaces provide improved annual fuel utilization efficiencies by maintaining nearly constant temperatures in the heated space by varying heat input based on measured temperatures of the supply (outdoor) air. Applications resembling variable air volume (VAV) and zoning systems allow air pressures in the building to remain stable by varying the supply air or directing air into different zones. Higher turndown is beneficial in these applications because the heat input can be matched with the varying supply of airflow to maintain the desired space temperatures and building pressures while operating within the furnace manufacturer's specifications.

In these condensing heat exchanger assemblies, latent heat is extracted from the products of combustion and condensation of water vapor occurs. Additionally, this condensate contains hydrochloric and sulfuric acids resulting from the high temperature combustion process. The condensate produced is therefore acidic, typically with a pH in the range of 4.0-6.0, which is mildly corrosive to conventional heat exchanger materials.

The primary corrosion mechanism with condensing furnaces is wet-dry cycling. Areas where condensate forms and then dries out tend to concentrate the acids contained in the condensate leading to corrosion and possible failure of even the most corrosion resistant materials used in heat exchanger construction. This is most likely to occur in the primary heat exchanger where the largest temperature differential occurs during the heating cycle.

There have been issues with condensing furnaces related to the risk of condensate freezing especially in outdoor "weatherized" and make-up air applications. Due to the acidic nature of condensate from combustion gases in condensing furnaces, a corrosion risk is present. Many conventional condensing furnaces also lack flexibility of design related to the directionality of airflow across the heat exchanger sections.

SUMMARY

The present technology provides a heat exchanger assembly for a furnace, e.g., a duct furnace, that is suitable for use in weatherized and non-weatherized applications. The assembly can provide a high efficiency furnace. Additionally, in weatherized applications (e.g., outdoor or mixed outdoor/indoor environments) where the furnace may be exposed to cold temperatures, the present system may prevent freezing of condensation that develops in the system.

In one aspect, the disclosure relates to a condensing furnace assembly that includes a plurality of heat exchanger passes. The condensing furnace may further include a burner assembly, a manifold assembly, and a combustion air device mounted to a frame. The heat exchanger assembly may include a first pass, a second pass, a third pass, and a fourth pass within the frame. The first pass has an inlet end in communication with at least one burner and an outlet end in communication with a first coupling box. The second pass includes an inlet end in communication with the first coupling box and an outlet end in communication with a second coupling box. The third pass may include an inlet end in communication with the second coupling box and an outlet end in communication with a third coupling box. The fourth pass including an inlet end in communication with the third coupling box and an outlet end in communication with a fourth coupling box. The first and second passes may be considered a primary heat exchanger assembly. The third and fourth passes may be considered a secondary heat exchanger assembly. The primary heat exchanger assembly may be generally parallel to the secondary heat exchanger assembly such that supply airflow may traverse over the primary and secondary heat exchangers simultaneously in both a first direction and in an opposite second direction.

The first pass may include a single drum. The second pass, third pass and fourth pass may include a plurality of tubes. The tubes in the subsequent passes have a diameter smaller than that of the drum forming the first pass. The tubes of the second pass have a larger diameter than the tubes of the third and fourth passes. In one embodiment, the tubes of the third and fourth passes may include a common sized diameter. In one embodiment, the tubes of the third pass may have a larger diameter than the tubes of the fourth pass. The cross-sectional area of the tubes in the fourth pass may be smaller than the cross-sectional area of the tubes in the third pass. In one embodiment, the cross-sectional area of the tubes in the fourth pass is smaller than the cross-sectional area of the tubes in the second pass. The secondary heat exchange section may be made from a corrosion-resistant material.

Additionally, the airflow direction may be bi-directional such that it may be switched wherein the airflow may traverse over the heat exchangers in an opposite direction. The airflow may be configured to traverse the primary heat exchanger assembly and the secondary heat exchanger assembly simultaneously in various directions such that a risk of condensation freezing within the heat exchange assemblies is reduced.

The heat exchanger, furnace design disclosed in the following provides for high efficiency, continuous condensing operation (90%+efficiency) for applications in weatherized and non-weatherized locations.

In one embodiment, provided is a high efficiency, condensing furnace that includes an enclosure in communication with a supply airflow to an associated building heating or ventilating system. The furnace may include at least one fuel-fired burner to produce combustion gases and a heat exchange assembly to heat the supply airflow. The heat exchanger assembly may include a primary heat exchange section having a first pass and second pass, such that the at least one fuel-fired burner may be disposed at an inlet end of the primary heat exchange section whereby combustion gases may be directed into the primary heat exchange section. A secondary heat exchange section may including a third pass and fourth pass wherein the primary heat exchange section and the secondary heat exchange section may be positioned in a generally parallel configuration within the supply airflow.

The first pass and the second pass of the primary heat exchange section may be positioned in a generally parallel configuration and in a series configuration with one another and the third pass and the fourth pass of the second heat exchange section may be positioned in a generally parallel configuration and in a series configuration with one another. At least one coupling box may be used to provide fluid communication between the primary heat exchange section and the secondary heat exchange section. A condensate drain may be in communication with the coupling box.

The first pass of the primary heat exchange section may be an elongated drum and the second, third, and fourth passes may each include a plurality of tubes. The tubes of the second, third, and fourth passes may each have a diameter that is smaller than that of the elongated drum. The plurality of tubes of the second pass may have a larger diameter than each of the plurality of tubes of the third and fourth pass. The third and fourth passes of the secondary heat exchange section may be made from corrosion resistant material. The at least one fuel-fired burner includes an input rate that is modulated to provide a turndown ratio grater than 4:1 or up to about 15:1 or more. The condensing furnace may be used in a system having supply air with an average temperature that is greater than about 40° F. (4.4° C.) or that is less than about 40° F. (4.4° C.).

In another embodiment, provided is a multi-pass heat exchanger for a high-efficiency condensing furnace. The heat exchanger may include a primary heat exchange section and a secondary heat exchange section. The primary heat exchange section may be positioned generally parallel and adjacent to the secondary heat exchange section such that the primary and secondary heat exchange sections are generally co-planar to a supply airflow. The supply air flow may traverse both the primary heat exchanger passes and the secondary heat exchanger passes simultaneously. The primary heat exchange section may be positioned generally parallel and in series with respect to the supply airflow. The secondary heat exchanger section may be positioned generally parallel and in series with respect to the supply airflow.

Also provided is a method of operating a furnace assembly to heat supply airflow directed into a building heating or ventilating system. The method includes directing heated combustion gases through a primary heat exchange section, wherein the primary heat exchange section including two or more passes. Heated combustion gases may be directed through a secondary heat exchange section, the secondary heat exchange section including two or more passes such that the combustion gases in the primary heat exchange section passes include a higher temperature than the combustion gases in the secondary heat exchange section passes. Supply airflow may be directed over the primary heat exchange section and secondary heat exchange section such that the supply air passes over the primary heat exchange section and the secondary heat exchange section simultaneously to transfer heat from the heated combustion gases to the flow of supply air. The heated supply air may be directed into the building heating or ventilating system.

Combustion gases may be provided in the primary exchange section at a temperature that remains above a dew point temperature of the combustion gases. Said combustion gases may be directed to the secondary heat exchange section such that the temperature of the combustion gases are reduced to near or below said dew point temperature of the combustion gases such that a portion of said combustion gases are condensed into condensate. A portion of heat from the secondary heat exchange section may be transferred to the supply air stream such that a thermal combustion efficiency of the heat exchange sections may be greater than 90%. Supply air having a temperature below 32° F. (0° C.) may be directed over the primary heat exchange section and the secondary heat exchange section. A portion of supply air passed over the primary heat exchange section may be partially mixed with a portion of supply air passed over the second heat exchange section to inhibit freezing of the condensate in the secondary heat exchange section. A surface of the secondary heat exchange section may be radiantly heated to an elevated surface temperature from the generally parallel and adjacent primary heat exchange section to inhibit freezing of the condensate in the secondary heat exchanger. A condensate drain may be radiantly heated from the adjacent primary heat exchange section during and at the end of an operational cycle to inhibit freezing of condensate in the drain.

A heat exchanger assembly in accordance with aspects and embodiments of the present technology can be used in a furnace assembly to provide a high efficiency furnace. In embodiments, it may provide an efficient turndown ratio while being able to reduce the gas input modulation. Further, the present heat exchangers and furnaces provide a design to provide a weatherized furnace that allows the temperatures of the gases inside the leading heat exchange section tubes to remain above their dew point to avoid excess condensation in said tubes even at reduced firing rates during modulated operation. Maintaining gas temperatures in the leading heat exchange section well above the dew point may assist with extending the life and safe operation of the furnace.

The following description and the drawings disclose various illustrative aspects. Some improvements and novel aspects may be expressly identified, while others may be apparent from the description and drawings.

BRIEF DESCRIPTION OF THE DRAWINGS

Operation of the disclosure may be better understood by reference to the following detailed description taken in connection with the following illustrations, wherein.

DETAILED DESCRIPTION

Reference will now be made in detail to embodiments of the present disclosure, examples of which are illustrated in the accompanying drawings. It is to be understood that other embodiments may be utilized and structural and functional changes may be made without departing from the respective scope of the disclosure. Moreover, features of the various embodiments may be combined or altered without departing from the scope of the disclosure. As such, the following description is presented by way of illustration only and should not limit in any way the various alternatives and modifications that may be made to the illustrated embodiments and still be within the spirit and scope of the disclosure.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As illustrated by FIGS. 1-8, a condensing furnace 10 is disclosed that may be arranged within an enclosure that is in communication with a supply airflow through a ventilation system (not shown). The ventilation system generally includes ductwork that handles the airflow of an HVAC system of a building.

Figure 1:
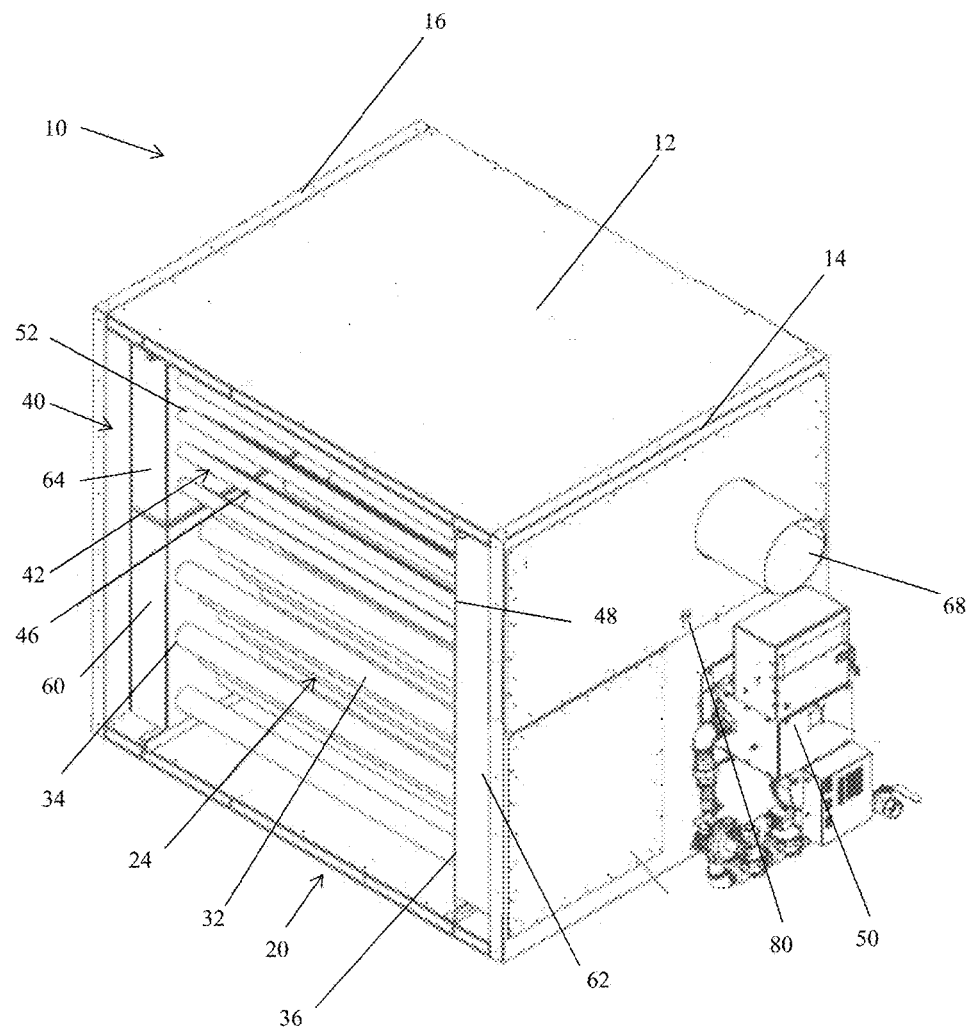
FIG. 1 is a perspective view of an embodiment of a condensing furnace of the present disclosure.
Figure 2:
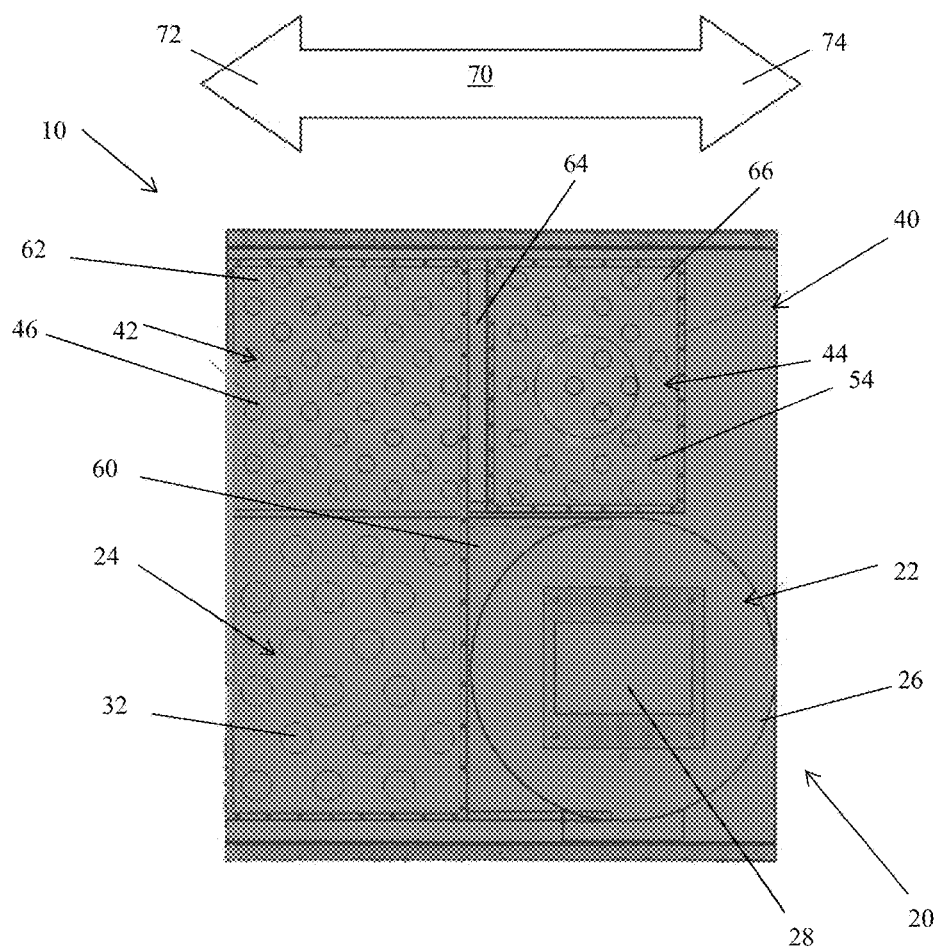
FIG. 2 is a cross sectional view of the condensing furnace of FIG. 1.
Figure 3:
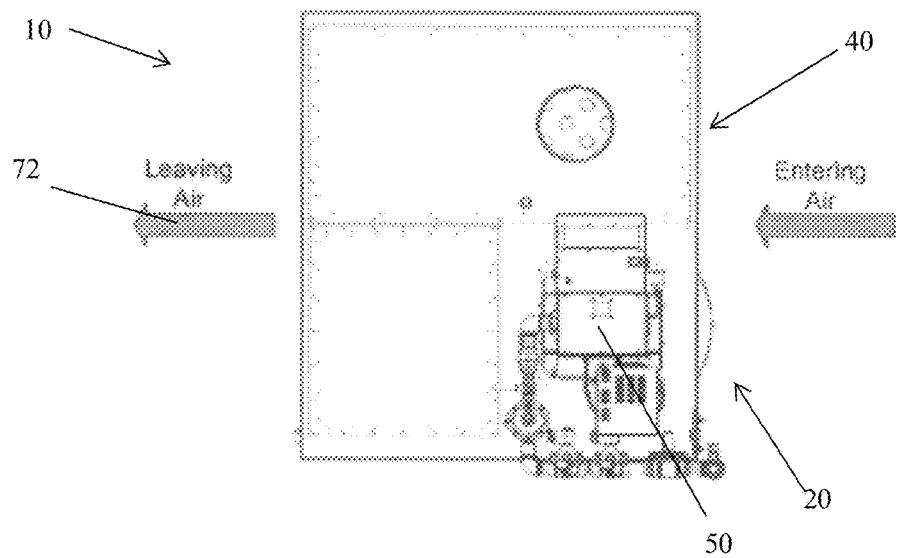
FIG. 3 is a front view of the condensing furnace of the present disclosure.
Figure 4:
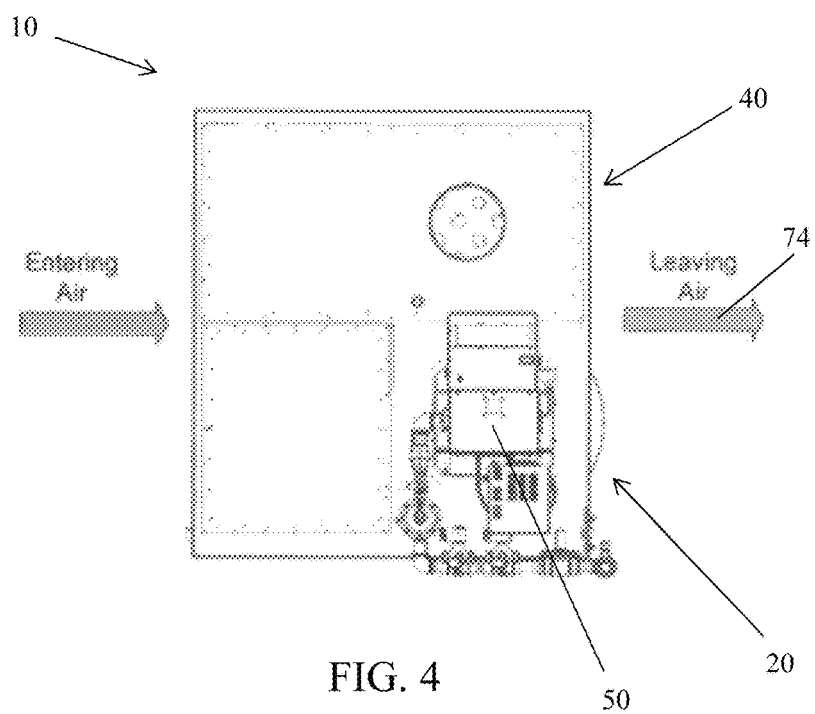
FIG. 4 is a front view of the condensing furnace of the present disclosure.
Figure 5:
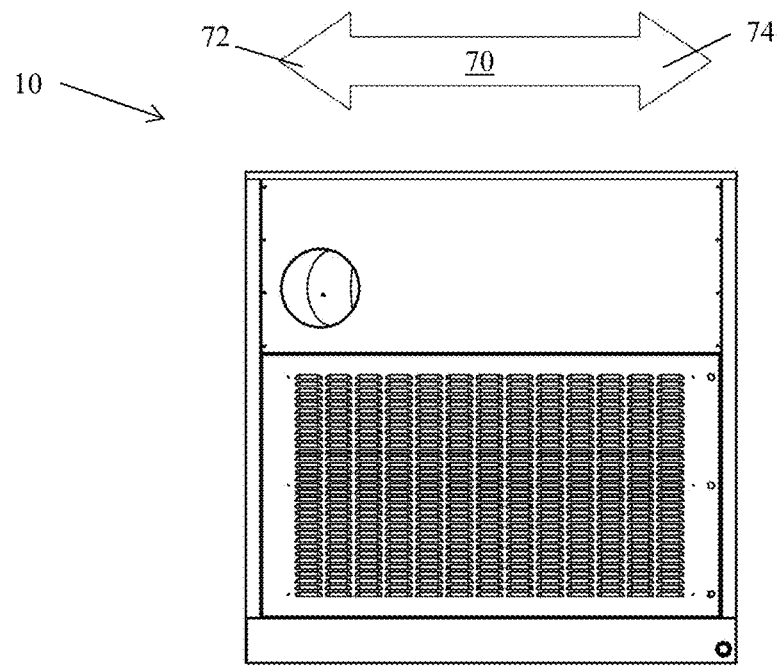
FIG. 5 is a front view of a housing of the condensing furnace of the present disclosure.

The condensing furnace 10 includes a primary heat exchanger assembly 20 and a secondary heat exchanger assembly 40 contained within a frame 12. As shown by FIG. 1, the frame 12 may include a first side 14 and a second side 16 wherein the first side 14 may be spaced from and generally parallel to the second side 16 such that an airflow 70 to be conditioned by the furnace 10 may pass through the frame 12. The primary and second heat exchangers are arranged in parallel so that the flow of air over each occurs simultaneously regardless of the direction of the airflow. As illustrated by FIG. 2, the primary heat exchanger assembly 20 is generally positioned along a bottom portion of the frame 12 and the secondary heat exchanger assembly 40 is generally positioned along a top portion of the frame 12 in a co-planar configuration.

The primary heat exchanger assembly 20 may include a first pass section 22 and a second pass section 24. Each pass defining a fluid flow path, e.g., a heated fluid flow path. The primary heat exchanger 20 may be made of conventional heat exchanger materials such as aluminized coated steel, such as 409 SS other similar material grades. The first pass 22 may include a drum 26 having an inlet end 28 and an outlet end 30. The inlet end 28 may be attached to or adjacent to the first side 14 of the frame 12 and the outlet end may be attached to or adjacent to the second side 16 of the frame 12. The inlet end 28 may be in communication with a burner assembly 50 through the first side 14. The burner assembly 50 may include a plurality of burner heads such that at least one of the burner heads may be configured to fire combustion gas through the first side 14 and into the inlet end 28 of the drum 26. In one embodiment, the burner assembly 50 may be a fuel fired force draft burner type assembly that may be configured to fire combustion gas through the first side 14 and into the inlet end 28 of the drum 26.

The second pass 24 may include a plurality of tubular shaped heat exchanger tubes 32. The tubes 32 may each include an inlet end 34 and an opposite outlet end 36. The inlet ends 34 of the second pass 24 may be aligned with the outlet end 30 of the drum 26 and generally adjacent to the second side 16 of the frame 12. The outlet ends 36 of the tubes 32 may be aligned with the inlet end 28 of the drum and generally adjacent to the first side 14 of the frame 12. The first pass 22 and the second pass 24 may be arranged in series relationship such that the airflow 70 traverses either the first pass 22 before the second pass 24 or the second pass 24 before the first pass 22 depending on the direction 72, 72 of the airflow 70.

The outlet end 30 of the drum 26 may be in communication with a first coupling box 60. The first coupling box 60 may define a cavity that allows the drum 26 of the first pass 22 to be in fluid communication with the tubes 32 of the second pass 24 thereby allowing combustion gas to travel there through. The first coupling box 60 may extend along the second side 16 of the frame 12. As illustrated by FIG. 1, the first coupling box 60 may be positioned within the frame 12 along an internal surface of the second side 16. However, the first coupling box 60 may also be positioned along an outer surface of the second side 16 and this disclosure is not limited as to the configuration or size of the first coupling box 60.

Figure 6:
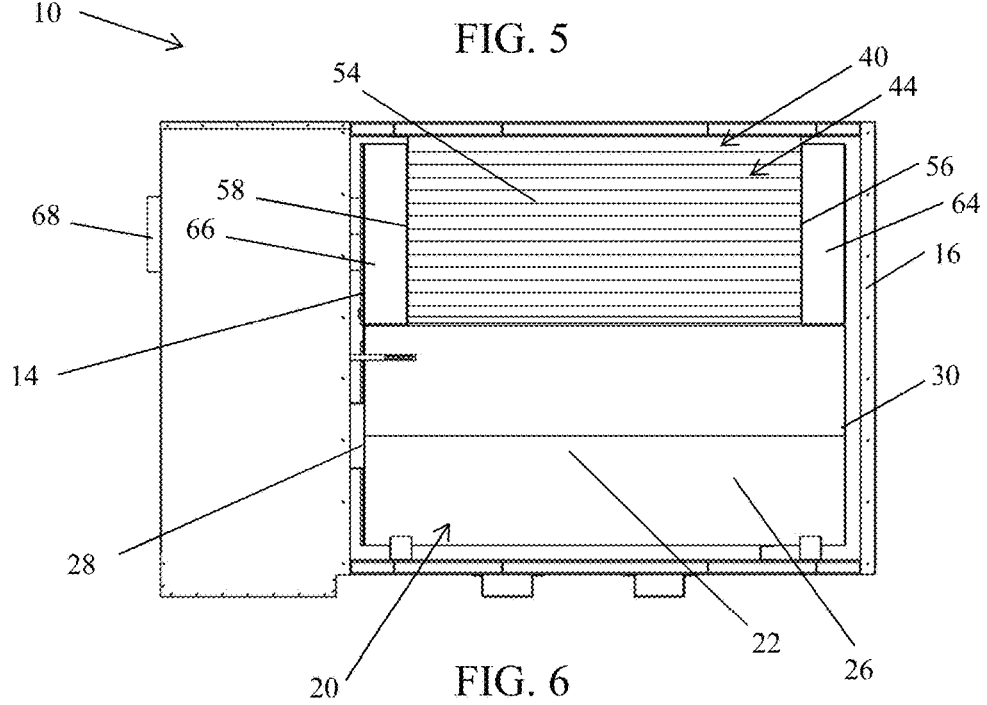
FIG. 6 is a side view of the housing of the condensing furnace of the present disclosure.
Figure 7:
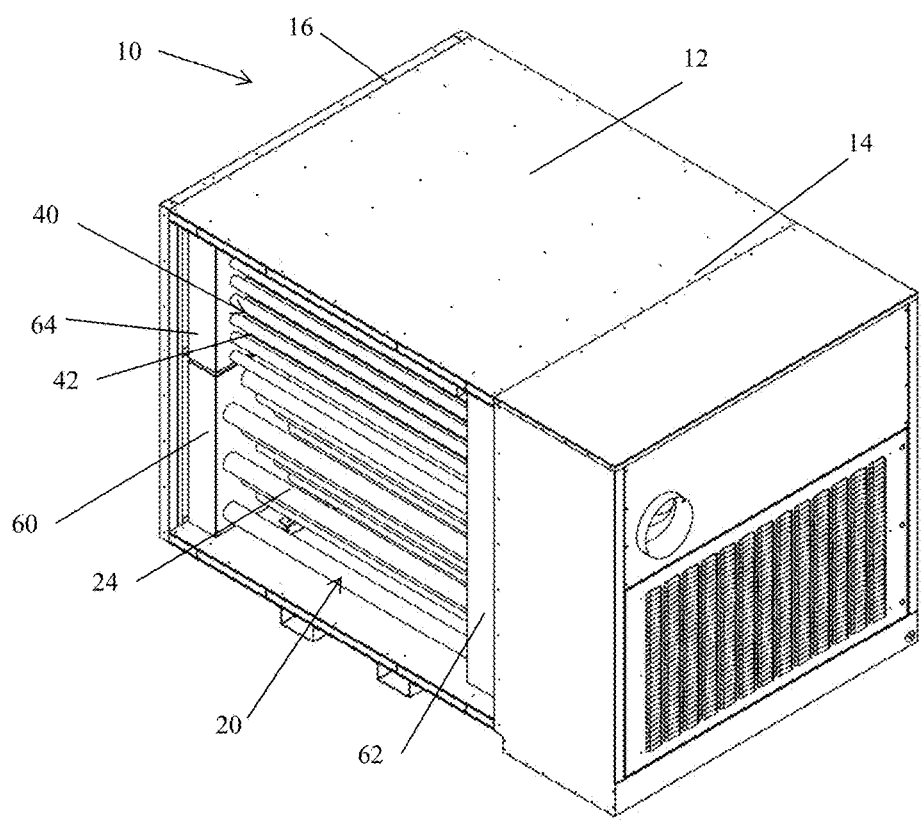
FIG. 7 is a perspective view of the housing of the condensing furnace of the present disclosure.
Figure 8:
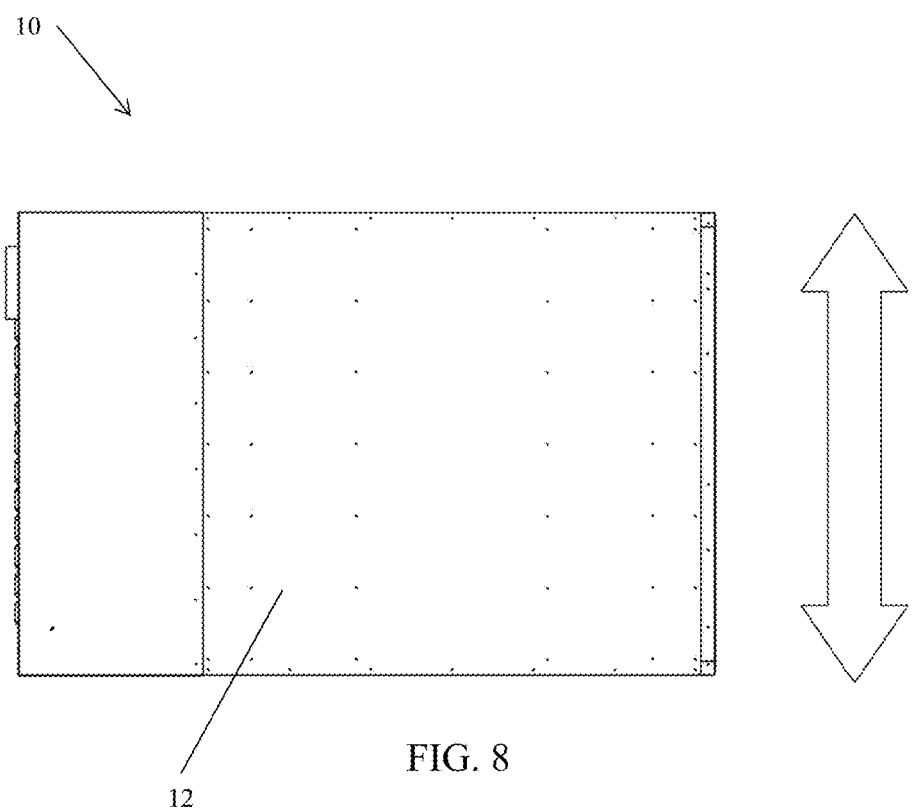
FIG. 8 is a top view of the housing of the condensing furnace of the present disclosure.

The secondary heat exchanger 40 may include a third pass section 42 (FIGS. 1 and 2) and a fourth pass section 44 (FIGS. 2 and 6). Each pass in the secondary heat exchanger defines a fluid flow path, e.g., a heated fluid flow path. The third pass 42 may include a plurality of tubular shaped heat exchanger tubes 46 each having an inlet end 48 and an outlet end 52. The inlet ends 48 may be attached to or adjacent to the first side 14 of the frame 12 and the outlet ends 52 may be attached to or adjacent to the second side 16 of the frame 12. The inlet ends 48 may be in communication with a second coupling box 62 adjacent the first side 14.

Additionally, the fourth pass 44 (FIG. 6) may include a plurality of tubular shaped heat exchanger tubes 54. The tubes 54 may each include an inlet end 56 and an opposite outlet end 58. The inlet ends 56 of the fourth pass 44 may be adjacent to the outlet end 30 of the drum 26 and generally adjacent to the second side 16. The outlet ends 58 of the tubes 54 may be aligned with the inlet end 28 of the drum and generally adjacent to the first side 14 of the frame 12. The third pass section 42 and the fourth pass section 44 may be arranged in series relationship such that the airflow 70 traverses either the third pass 42 before the fourth pass 44 or the fourth pass 44 before the third pass 42 depending on the direction 72, 72 of the airflow 70.

The outlet ends 36 of the second pass tubes 32 and the inlet ends 48 of the third pass tubes 46 may be in communication with the second coupling box 62. The second coupling box 62 may define a cavity that allows the tubes 32 of the second pass 24 to be in fluid communication with the tubes 46 of the third pass 42 thereby allowing combustion gas to travel there through. The second coupling box 62 may extend along the first side 14 of the frame 12. As illustrated by FIG. 1, the second coupling box 62 may be positioned within the frame 12 along an internal surface of the first side 16. However, the second coupling box 62 may also be positioned along an outer surface of the first side 14 and this disclosure is not limited as to the configuration or size of the second coupling box 62.

The outlet ends 52 of the third pass tubes 46 and the inlet end 56 of the fourth pass tubes 54 may be in communication with a third coupling box 64. The third coupling box 64 may define a cavity that allows the tubes 46 of the third pass 42 to be in fluid communication with the tubes 54 of the fourth pass 44 thereby allowing combustion gas to travel there through. The third coupling box 64 may extend along the second side 16 of the frame 12. As illustrated by FIG. 1, the third coupling box 64 may be positioned within the frame 12 along an internal surface of the second side 16. However, the third coupling box 64 may also be positioned along an outer surface of the second side 16 and this disclosure is not limited as to the configuration or size of the third coupling box 64.

Further, the outlet ends 58 of the fourth pass tubes 54 may be in communication with a fourth coupling box 66. The fourth coupling box 66 may define a cavity that allows the tubes 54 of the fourth pass 44 to collect exhaust gas and condensate therefrom thereby allowing them to drain or otherwise exit from the system. The fourth coupling box 66 may extend along a portion of the first side 14 of the frame 12. As illustrated by FIGS. 2 and 6, the fourth coupling box 66 may be positioned within the frame 12 along an internal surface of the first side 14. However, the fourth coupling box 66 may also be positioned along an outer surface of the first side 14 and this disclosure is not limited as to the configuration or size of the fourth coupling box 66. An exhaust connector 68 may extend from the fourth coupling box 66 and a condensate drain 80 may extend from the fourth coupling box 66. Additionally, the exhaust connector 68 and condensate drain 80 may extend through the first side 14 of the frame 12.

In one embodiment, the first coupling box 60 and the third coupling box 64 define cavities generally adjacent to one another along the second side 16 of the frame 12 while the second coupling box 62 and the fourth coupling box 66 define cavities generally adjacent to one another along the first side 14 of the frame 12. These cavities are generally isolated from one another and maintain internal communication through the respective primary and secondary heat exchanger tubes and drum wherein combustion gasses traveling therein may be routed through the turns of the primary and secondary heat exchangers 20, 40 in a four pass configuration prior to exhausting flue gases and condensate from the condensing furnace 10.

In one embodiment, the diameters of the tubes 46 of the third pass 46 and the diameters of the tubes 54 of the fourth pass may have a common size. Notably, the diameters of the tubes 46 of the third pass 42 and the tubes 54 of the fourth pass 44 may be smaller than the diameters of the tubes 32 of the second pass 24. The tubes 32 of the second pass 24 may include diameters that are smaller than diameter of the drum 26 of the first pass 22. However, this disclosure is not limited as to the size and number of tubes and drum associated with each respective pass. In one embodiment, the diameters of the tubes defining the third and fourth passes may be chosen such that they are sufficiently large to prevent blockage of the tubes by condensate based on condensate volume produced should the air entering the heat exchanger be at or below the freezing temperature of the condensate.

In one embodiment, the collective cross sectional area of the tubes of the second pass is reduced relative to the collective cross sectional area of the first pass (drum). In another embodiment, the collective cross-sectional area of the tubes in the second pass is greater than the cross-sectional area of the tubes in the third pass. In the secondary heat exchanger, the collective cross sectional area of the tubes of the fourth pass is reduced relative to the collective cross sectional area of the tubes of the third pass. That is, the total area of exchanger tube openings is reduced in both the primary and secondary heat exchanger sections (relative to the direction of the heated fluid flow). The cross sectional areas of the tubes, as illustrated by FIG. 2, may be generally consistent between the inlet ends and the outlet ends of each of the tubes/drum of the four passes. This relationship may assist with the velocity of the flow of combustion gas within the tubes/drum while maximizing the surface area of the tubes/drum within the flow of the supply airflow that is to be conditioned through the furnace.

Additionally, while the shape of the tubes may be selected as desired for a particular purpose or intended application. The tubes in the embodiments illustrated in FIG. 1 to FIG. 8 are illustrated as circular, unfinned tubes. It will be appreciated that the furnace is not limited to having such tubes. In one embodiment, the tubes may be finned. Additionally, the tubes defining the different passes need not all be of the same shape. Thus, one section or pass may comprise finned tubes, while one or more other sections may comprise finned or non-finned tubes.

The tubes in the second, third, fourth, etc., passes may be aligned or oriented as desired. In the embodiment illustrated in FIGS. 1-8, the tubes in the second, third, and fourth passes are arranged in offset rows. It will be appreciated that the tubes may be aligned in a random orientation or in rows that are aligned both horizontally and vertically.

In one embodiment, each of the passes of the primary and secondary heat exchanger assemblies 20, 40 are positioned within a quadrant of the frame 12 of the condensing furnace 10. This feature is illustrated by FIG. 2, in which the drum 26 of the first pass section 22 is located in a first quadrant. The tubes 32 of the second pass 24 are located in a second quadrant. The tubes 46 of the third pass 42 are located in a third quadrant. The tubes 54 of the fourth pass 44 are located in a fourth quadrant. The first, second, third, and fourth quadrants of the frame 12 are able to communicate with a supply air 70 that traverses the primary and secondary heat exchanger assemblies 20, 40 simultaneously. The supply air 70 generally flows in a first direction 72 or a second direction 74 relative to the condensing furnace 10.

As illustrated by FIGS. 2-5, the supply air 70 is configured to flow in both the first direction 72 and the second direction 74 across the primary and secondary heat exchanger assemblies 20, 40. The primary heat exchanger assembly 20 and the secondary heat exchanger assembly 40 may be oriented within a ventilation system such that airflow 70 can traverse the respective disclosed assemblies in various directions while operating in typical working parameters with a reduced risk of condensation freezing within the secondary heat exchange assembly 40.

While the embodiments in the figures are shown with four passes, it will be appreciated that the number of passes is not so limited and may be chosen as desired for a particular purpose or intended application. That is, the primary and secondary heat exchanger can individually comprise, 2 or more passes/fluid flow paths. The number of passes/fluid flow paths in the primary heat exchanger may the same or different than the number of passes/fluid flow paths in the secondary heat exchanger.

In operation, the burner assembly 50 fires combustion gases through the drum 26 such that hot combustion gases enter the inlet end 28 and exits the outlet end 30 (FIG. 6) and flows into the first coupling box 60. The drum 26 receives the highest temperature combustion gases from the burner assembly 50. The combustion gases remain above the due point temperature even as the airflow 70 traverses over the surfaces of the primary heat exchanger assembly 20. The combustion gases may flow through the first coupling box 60 through the inlets 34 of the tubes 32 of the second pass 34 of the primary heat exchanger assembly 20 (FIG. 1). The combustion gases may then flow through the outlet ends 36 into the second coupling box 62 and through the inlet ends 48 of the tubes 46 of the third pass 42 of the secondary heat exchanger assembly 40 (FIG. 1). The combustion gases may flow through the outlet ends 52 into the third coupling box 64 and through the inlet ends 56 of the tubes 54 of the fourth pass 44 of the secondary heat exchanger assembly 40 (FIG. 6). The combustion gases may flow through the outlet ends 58 into the fourth coupling box 66 and be exhausted through the exhaust connector 68. Here, more heat is extracted from the combustion gases and as a result the gases may be cooled to the point where water vapor in the flue gases may condense. The condensate may be drained from the condensate drain 80 of the fourth coupling box 66. Condensate formed may be acidic and contain hydrochloric and sulfuric acid. Therefore, the secondary heat exchanger 40 may be made of a proprietary or high grade corrosion material.

The drain may be positioned in relative close proximity to the primary firing pass such that residual heat from the primary heat exchanger maintains higher condensate temperatures for sufficient time to allow the condensate to flow and drain completely. This may be particularly beneficial in weatherized applications where the furnace is exposed to outdoor temperatures during heating "off" cycles.

As illustrated by FIGS. 1 and 2, the airflow 70 of the HVAC system may traverse the heat exchanger assemblies in the first direction 72 or the second direction 74 as combustion gas flows through the primary and secondary heat exchange assemblies 20, 40.

The burner assembly 50 may include electronic controls that allow the burner flame to be modulated between a high and a low setting depending on the level of heat required. Additionally, the burner assembly 50 may have a modulating or variable capacity gas valve having an electronic control system for the burner that allows very fine adjustments to the burner setting and blower motor speed, modulating them to keep the temperature of the heated space very close to a thermostat setting, or maintain a desired supply air temperature for ventilation air provided to the space.

In this configuration, the condensing furnace 10 extracts useful heat even after the combustion exhaust gases have "cooled" through the primary heat exchanger assembly 20. This is accomplished by the secondary heat exchangers, wherein the water vapor contained in the flue gases entering the secondary heat exchanger 40 is condensed as heat is extracted from the combustion flue gases in these sections.

The acid condensate resulting from the gases going through the secondary heat exchanger 40 may be drained and may be discharged through a drain pipe such as a plastic PVC or CPVC pipe. The condensate may attack and corrode the furnace body or any other metal with which it comes in contact. Additionally, the condensing furnace flue exhaust gases may be relatively cool and can be vented from the exhaust connector 68 with vent pipe suitable for Category II, III, IV vent systems (gastight and watertight) because of their low temperature of around 130° F. (54.4° C.) or less.

This condensing furnace assembly 10 may maintain internal thermal fluid and tube surface temperatures above the dew point of the exhaust materials in the primary heater tube section. Corrosion-resistant tubing materials may be utilized in the secondary heat exchanger assembly, where condensing of water vapor in flue gases occurs.

The condensate produced by the combustion of gaseous fuels (i.e., natural gas, propane gas, etc.) however is acidic and corrosive (approximately 4.0-6.0 pH) even to most stainless steel materials. In the disclosed design the secondary heat exchanger may be made from materials which resist corrosive attack from this condensate The primary and secondary heat exchangers 20, 40 may be simultaneously exposed to the airflow 70 along either the first direction 72 or the second direction 74 to allow for heating of the airflow 70 while allowing for supply airflow to be bi-directional without losing efficiency, to sufficiently prevent freezing in the condensing sections, and/or to provide for higher turndown operation.

This configuration allows for lower modulated inputs with airflow 70 provided from outdoor supply air temperatures, especially where constant volume airflow is required, e.g. in building ventilation conditions. As such, the turndown ratio for the condensing furnace 10 may be about 15 to 1.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The features of each embodiment described and shown herein may be combined with the features of the other embodiments described herein. The claims as follows are intended to include all modifications and alterations insofar as they come within the scope of the claims or the equivalent thereof.

Having thus described the invention, I claim:

1. A high efficiency, condensing furnace comprising:
an enclosure in communication with a supply airflow to the duct work of an associated building heating or ventilating system;
at least one fuel-fired burner to produce combustion gases; and
a heat exchange assembly to heat the supply airflow, the heat exchanger assembly comprising:
a primary heat exchange section having a first pass and second pass, such that the at least one fuel-fired burner is disposed at an inlet end of the primary heat exchange section, whereby combustion gases may be directed into the primary heat exchange section; and
a secondary heat exchange section including a third pass and fourth pass, wherein the primary heat exchange section and the secondary heat exchange section are positioned in a generally parallel configuration within the supply airflow,
wherein the first pass includes an inlet end in communication with at least one fuel-fired burner and an outlet end in fluid communication with a first coupling box;
the second pass includes an inlet end in fluid communication with the first coupling box and an outlet end in fluid communication with a second coupling box;
the third pass includes an inlet end in fluid communication with the second coupling box and an outlet end in fluid communication with a third coupling box; and
the fourth pass includes an inlet end in fluid communication with the third coupling box and an outlet end in communication with a fourth coupling box.

2. The condensing furnace of claim 1 wherein, the first pass and the second pass of the primary heat exchange section are positioned in a generally parallel configuration and in a series configuration with one another, and the third pass and the fourth pass of the second heat exchange section are positioned in a generally parallel configuration and in a series configuration with one another.

3. The condensing furnace of claim 1, further comprising at least one coupling box to provide fluid communication between the primary heat exchange section and the secondary heat exchange section.

4. The condensing furnace of claim 1, further comprising a condensate drain in communication with at least one coupling box.

5. The condensing furnace of claim 1, wherein the first pass of the primary heat exchange section is an elongated drum and the second, third, and fourth passes each include a plurality of tubes, the tubes of the second, third, and fourth passes each having a diameter smaller than that of the elongated drum.

6. The condensing furnace of claim 5, wherein the plurality of tubes of the second pass have a larger diameter than each of the plurality of tubes of the third and fourth pass.

7. The condensing furnace of claim 1, wherein the third and fourth passes of the secondary heat exchange section are made from corrosion resistant material.

8. The condensing furnace of claim 1, wherein the at least one fuel-fired burner includes an input rate that is modulated to provide a turndown ratio of 4:1 or greater.

9. The condensing furnace of claim 1, wherein the at least one fuel-fired burner includes an input rate that is modulated to provide a turndown ration of up to 15:1.

10. The condensing furnace of claim 1, wherein the condensing furnace is used in a system having supply air with an average temperature that is greater than about 40° F.

11. The condensing furnace of claim 1, wherein the condensing furnace is used in a system having supply air with an average temperature that is less than about 40° F.

12. The condensing furnace of claim 11, wherein the supply airflow direction is bi-directional such that it is operably switched to traverse over the primary and secondary heat exchangers in a first direction or in an opposite second direction.

13. The condensing furnace of claim 1, wherein the supply air flow traverses both the primary heat exchange section passes and the secondary heat exchange section passes simultaneously.

14. The condensing furnace of claim 1, wherein the primary heat exchange section is positioned generally parallel and in series with respect to the supply airflow.

15. The condensing furnace of claim 1, wherein the secondary heat exchange section is positioned generally parallel and in series with respect to the supply airflow.

16. A method of operating a furnace assembly to heat supply airflow directed into a building heating or ventilating system, the method comprising:
   directing heated combustion gases through a primary heat exchange section, the primary heat exchange section including two or more passes;
   directing heated combustion gases through a secondary heat exchange section, the secondary heat exchange section including two or more passes such that the combustion gases in the primary heat exchange section passes include a higher temperature than the combustion gases in the secondary heat exchange section passes;
   providing combustion gases in the primary exchange section at a temperature that remains above a dew point temperature of the combustion gases;
   directing said combustion gases to the secondary heat exchange section such that the temperature of the combustion gases are reduced to near or below said dew point temperature of the combustion gases such that a portion of said combustion gases are condensed into condensate;
   directing supply airflow over the primary heat exchange section and secondary heat exchange section such that the supply air passes over the primary heat exchange section and the secondary heat exchange section simultaneously to transfer heat from the heated combustion gases to the flow of supply air;
   directing supply airflow having a temperature below 32° F. over the primary heat exchange section and the secondary heat exchange section; and
   partially mixing a portion of supply air passed over the primary heat exchange section with a portion of supply air passed over the second heat exchange section to inhibit freezing of the condensate in the secondary heat exchange section; and
   directing the heated supply air into the building heating or ventilating system.

17. The method of claim 16, further comprising:
   transferring a portion of heat from the secondary heat exchange section to the supply air stream such that a thermal combustion efficiency of the heat exchange sections is greater than 90%.

18. The method of claim 16 further comprising:
   radiantly heating a surface of the secondary heat exchange section to an elevated surface temperature from the generally parallel and adjacent primary heat exchange section to inhibit freezing of the condensate in the secondary heat exchanger.

19. The method of claim 16 further comprising:
   radiantly heating a condensate drain from the primary heat exchange section to the condensate drain during and at the end of an operational cycle to inhibit freezing of condensate in the drain.

20. A high efficiency, condensing furnace comprising:
   an enclosure in communication with a supply airflow to the duct work of an associated building heating or ventilating system;
   at least one fuel-fired burner to produce combustion gases; and
   a heat exchange assembly to heat the supply airflow, the heat exchanger assembly comprising:
   a primary heat exchange section having a first pass and second pass, such that the at least one fuel-fired burner is disposed at an inlet end of the primary heat exchange section, whereby combustion gases may be directed into the primary heat exchange section; and
   a secondary heat exchange section including a third pass and fourth pass, wherein the primary heat exchange section and the secondary heat exchange section are positioned in a generally parallel configuration within the supply airflow;
   wherein the first pass of the primary heat exchange section is an elongated drum and the second, third, and fourth passes each include a plurality of tubes, the tubes of the second, third, and fourth passes each having a diameter smaller than that of the elongated drum; and
   wherein the plurality of tubes of the second pass have a larger diameter than each of the plurality of tubes of the third and fourth pass.

21. The condensing furnace of claim 20 wherein, the first pass and the second pass of the primary heat exchange section are positioned in a generally parallel configuration and in a series configuration with one another, and the third pass and the fourth pass of the second heat exchange section are positioned in a generally parallel configuration and in a series configuration with one another.

22. The condensing furnace of claim 20, further comprising at least one coupling box to provide fluid communication between the primary heat exchange section and the secondary heat exchange section.

23. The condensing furnace of claim 20, further comprising a condensate drain in communication with at least one coupling box.

\* \* \* \* \*